United States Patent
McCanne et al.

(10) Patent No.: US 9,407,727 B1
(45) Date of Patent: Aug. 2, 2016

(54) OPTIMIZING COMMUNICATIONS USING CLIENT-SIDE RECONSTRUCTION SCRIPTING

(71) Applicant: Riverbed Technology, Inc., San Francisco, CA (US)

(72) Inventors: Steven McCanne, Berkeley, CA (US); Michael J. Demmer, San Francisco, CA (US); Derek J. Watson, Alamo, CA (US); David Tze-Si Wu, San Francisco, CA (US)

(73) Assignee: RIVERBED TECHNOLOGY, INC., San Francisco, CA (US)

( * ) Notice: Subject to any disclaimer, the term of this patent is extended or adjusted under 35 U.S.C. 154(b) by 351 days.

(21) Appl. No.: 13/975,049

(22) Filed: Aug. 23, 2013

Related U.S. Application Data

(63) Continuation-in-part of application No. 13/249,183, filed on Sep. 29, 2011, now abandoned.

(60) Provisional application No. 61/502,856, filed on Jun. 29, 2011.

(51) Int. Cl.
*G06F 15/16* (2006.01)
*H04L 29/06* (2006.01)

(52) U.S. Cl.
CPC .................. *H04L 67/42* (2013.01)

(58) Field of Classification Search
CPC .......... G06F 17/30867; G06F 17/3028; G06F 17/30879; G06K 19/06046; G06K 19/086; H04L 2209/12; H04L 67/1097
USPC ...................................... 435/320.1
See application file for complete search history.

(56) References Cited

U.S. PATENT DOCUMENTS

| | | | |
|---|---|---|---|
| 6,049,821 A | 4/2000 | Theriault | |
| 6,961,760 B2 | 11/2005 | Li | |
| 8,111,944 B2 | 2/2012 | Cheng | |
| 8,219,633 B2 * | 7/2012 | Fainberg | G06F 17/30902 709/200 |
| 8,484,162 B2 * | 7/2013 | Prahlad | G06F 11/1453 707/640 |
| 9,116,934 B2 * | 8/2015 | Kaldas | G06F 17/30303 |
| 2003/0177443 A1 * | 9/2003 | Schnelle | G06F 17/30917 715/227 |
| 2008/0201452 A1 | 8/2008 | Athas | |
| 2011/0307238 A1 * | 12/2011 | Scoda | G06F 9/45529 703/26 |
| 2012/0047328 A1 * | 2/2012 | Williams | G11B 5/09 711/118 |
| 2013/0013859 A1 | 1/2013 | Zhu | |
| 2014/0297292 A1 * | 10/2014 | Marko | G10L 19/00 704/500 |
| 2015/0195340 A1 * | 7/2015 | Tulchinsky | H04L 67/34 709/203 |

OTHER PUBLICATIONS

Roesner, Franziska, et al. "HTTP-Level Deduplication with HTML5" Network Class Project, Spring 2010.

* cited by examiner

*Primary Examiner* — Peling Shaw
(74) *Attorney, Agent, or Firm* — Park, Vaughan, Fleming & Dowler LLP; Laxman Sahasrabuddhe

(57) ABSTRACT

Systems and techniques are described for optimizing communications between a client and a server. Specifically, in some embodiments, an executing script on a client can send a resource request to a server. In response, the server can send an optimized version of the resource back to the client. The client can then reconstruct the resource from the optimized version of the resource.

13 Claims, 7 Drawing Sheets

OPTIMIZING COMMUNICATIONS USING CLIENT-SIDE RECONSTRUCTION SCRIPTING

RELATED APPLICATION

This application is a continuation-in-part of U.S. application Ser. No. 13/249,183, entitled "Optimized content communication using client-side reconstruction scripting," by inventor Michael J. Demmer, filed 29 Sep. 2011, the contents of which are herein incorporated by reference in their entirety for all purposes. U.S. application Ser. No. 13/249,183 claims benefit of U.S. Provisional Patent Application No. 61/502,856, filed Jun. 29, 2011, and entitled "Optimized Content Communication Using Client-Side Reconstruction Scripting," the contents of which are herein incorporated by reference in their entirety for all purposes.

BACKGROUND

The present disclosure relates to network communications in general and to optimizing network communications using client-side reconstruction scripts in particular.

Data communications networks, such as local area networks (LANs) and wide area networks (WANs) often include a variety of network devices for sending, receiving, directing, and optimizing network data traffic. WAN optimization devices are one type of network device that improve network performance in reading and/or writing data over a WAN such as the internet or a private WAN. WAN optimization devices often operate in pairs on both sides of a WAN or other slower network connection to compress, prefetch, cache, and otherwise optimize network traffic. For example, a WAN optimization device may intercept network traffic from a server before it reaches the WAN; compress this network traffic; and communicate this compressed network traffic over the WAN to a second WAN optimization application or device near or within a client device. The second WAN optimization application or device then decompresses or otherwise processes the compressed network traffic to reconstruct the original network traffic and forward it, if necessary, to the destination client device.

WAN optimization devices are referred to in the art by many different terms, including, but not limited to, transaction accelerators, WAN optimizers, WAN optimization controllers (WOCs), wide-area data services (WDS) appliances, WAN traffic optimizers (WTOs), and protocol accelerators or optimizers. Additionally, techniques for optimizing network traffic to improve network performance in reading and/or writing data over a network are referred to in the art by many different terms, including, but not limited to, WAN acceleration, transaction acceleration, transaction pipelining, protocol pipelining, request prediction, application flow acceleration, and protocol acceleration. In this disclosure, the term "WAN optimization device" is used to refer to such devices and applications and "WAN optimization" is used to refer to such techniques.

Enterprise application development is rapidly shifting to a model that leverages recent advances in web-based technologies and mobile devices. There is an unmet need to optimize network traffic for applications that are developed using this new application development model.

SUMMARY

Some embodiments include a content transformation agent that transforms content at the server side of a WAN, such as the internet, to decrease the size of the content, thereby reducing the time and bandwidth required to communicate this content over the WAN. This also reduces the costs for both clients and the content provider.

In an embodiment, the client reconstructs the transformed content back to its original form by executing a script or other type of program. The script may be executed within a web browser or other application capable of presenting content and downloading and executing scripts. The script may be generated by the content transformation agent and communicated to the client in conjunction with the transformed content. The transformed content and the reconstruction script may be communicated with the client in response to a client request for the original content. In this manner, the content transformation agent leverages the presentation and script execution capabilities of the client to implement the functionality of a client side WAN optimization device.

In an embodiment, the content transformation agent reduces the size of the content at the server side of the WAN by partitioning the original content into segments. The content transformation agent then identifies and removes duplicate segments within the content. In a further embodiment, the content transformation agent may also identify and remove segments in content that are duplicative of segments previously provided to the client, which the client may have cached. The content transformation agent then generates a script or other type of program that copies segments into the locations of their previously removed counterparts. By executing this script, the client reconstructs the original content.

Embodiments described herein may be applied to content including markup data, such as HTML code specifying the content of a web page, presentation semantics data, such as cascading style sheet (CSS), and/or content behavior data, such as one or more scripts included in the original content.

In some embodiments, a client can send a first request for a script (e.g., a JavaScript script) to a first server. Next, the client can receive the script from the server in response to the first request. The client can then execute the script. Next, the executing script can generate a second request to access a resource. An optimization indicator can then be added to the second request (this step can be skipped if the second request already includes an optimization indicator). Next, the client can send the second request to a second server.

The second server can then receive the second request. If the second request includes an optimization indicator, the second server can determine a set of resource links, wherein each resource link in the set of resource links identifies a data segment in a set of data segments that was generated by performing data deduplication on the resource. The second server can then send at least the set of resource links to the client. On the other hand, if the second request does not include the optimization indicator, the second server can send the resource (i.e., without optimization) to the client.

The client can then receive the response to the second request. If the response includes the requested resource, the requested resource can be provided to the executing script. On the other hand, if the response includes a set of resource links, the resource can be reconstructed based on the set of resource links, and the reconstructed resource can be provided to the executing script. Each resource link in the set of resource links can identify a data segment in a set of data segments that was generated by performing data deduplication on the resource. Specifically, in some embodiments, each resource link in the set of resource links can be a uniform resource locator (URL).

In some embodiments, the resource can be reconstructed by performing the following steps for each resource link in the set of resource links: (1) in response to determining that the resource identified by the resource link is available in a web browser cache on the computer, retrieving the resource identified by the resource link from the web browser cache, and (2) in response to determining that the resource identified by the resource link is not available in the web browser cache on the computer, sending a third request to a third server to retrieve the resource identified by the resource link.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following cases: (1) only X; (2) only Y; (3) only Z; (4) X and Y; (5) X and Z; (6) Y and Z; and (7) X, Y, and Z. Additionally, in this disclosure, the term "based on" means "based solely or partially on."

Some embodiments described herein provide a content transformation agent that transforms content at the server side of a WAN, such as the internet, to decrease the size of the content. The transformed content is communicated to a client. The client includes an application with a script or program execution capabilities operating on a computer or other electronic communications device. After receiving the transformed content, the client reconstructs the original content by executing a script or other type of program within a web browser or other application capable of presenting content and downloading and executing scripts. The script may be generated by the content transformation agent and communicated to the client in conjunction with the transformed content in response to a client request for the original content. In this manner, the content transformation agent leverages the built-in presentation and script execution capabilities of the client to implement the functionality of a client side WAN optimization device. Because the transformed content is reconstructed using a script executed within a web browser or other application capable of executing scripts, a client side WAN optimization device or other specialized client side software or hardware is not required.

Figure 1:
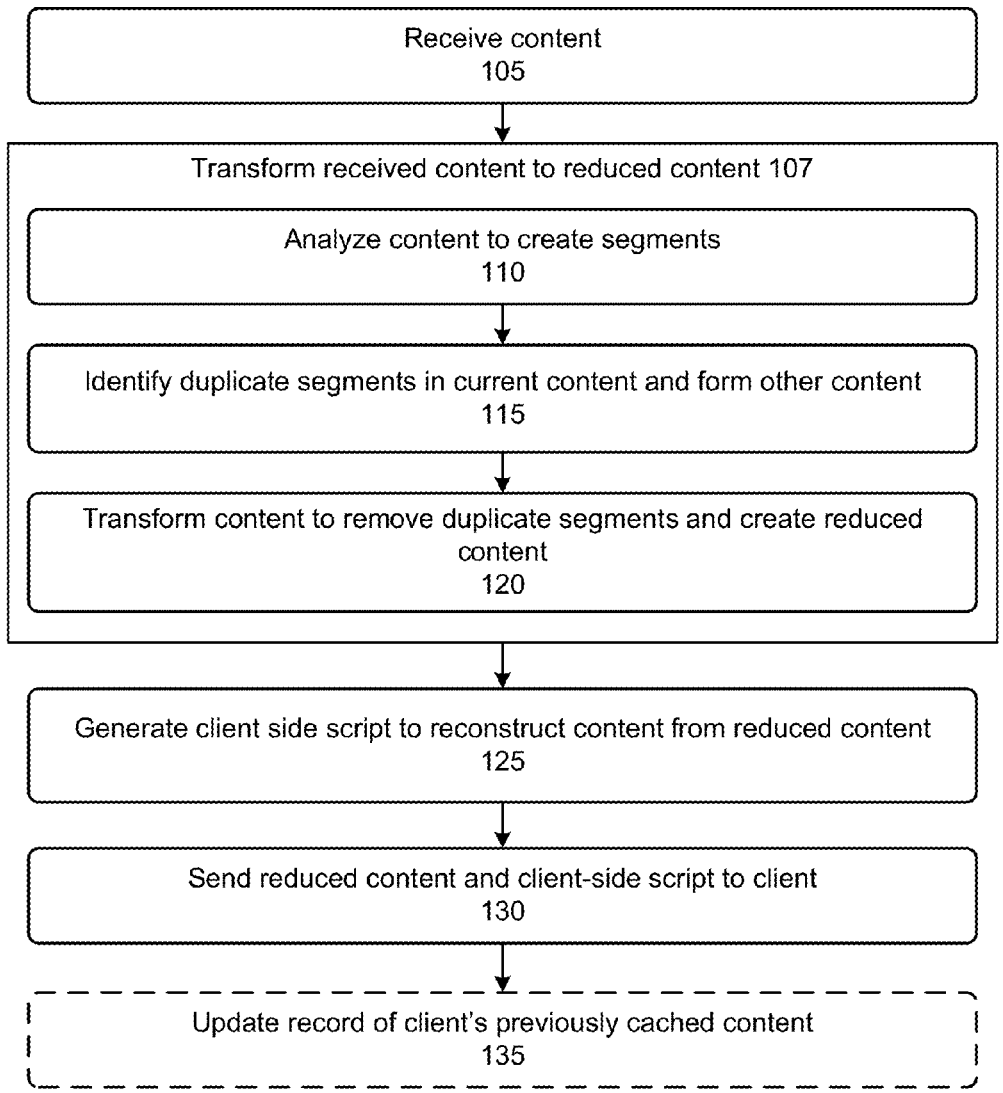
FIG. 1 illustrates a method 100 of transforming content for efficient communication over a network in accordance with some embodiments described herein.

FIG. 1 illustrates a method 100 of transforming content for efficient communication over a network in accordance with some embodiments described herein. Step 105 receives content for processing. Content may be static or dynamically generated in response to a client request. As described in detail below, content may be received by step 105 as it is being stored prior to a client request for the content or as it is being generated and communicated to a client in response to a client request.

Embodiments described herein may be applied to any type of content capable of being displayed or presented to a user through a client application including script execution capabilities. For example, content may be a web page or content presented within an application. Content may include several types of data that are processed and combined by a web browser or other application on the client device to create a static, dynamic, and/or interactive presentation for the user. For example, content may include markup data representing data to be presented to the user, such as HTML, XHTML, XML, or SVG data; presentation semantics data, such as a cascading style sheet (CSS) that specifies a document layout and other presentation parameters; and/or content behavior data, such as one or more scripts, for example expressed using JavaScript or other scripting languages. In a further embodiment, content may include binary media data such as images; animation or video; sound or music data; binary document files such as portable document format (PDF) files; or any other type of binary media data associated with an internet media type or MIME type and capable of being handled by a web browser, web browser plug-in module, or standalone application.

Embodiments of step 107 transform the received content into reduced content that is smaller in size. Step 107 may use any type of content transformation and/or data compression known in the art to transform the received content. As an example, one embodiment of step 107 transforms the received content by segmenting the content and then removing segments that are redundant and/or previously received and potentially stored by the client. Steps 110, 115, and 120 describe an example content transformation based on segmentation according to one embodiment described herein.

Step 110 analyzes all or a portion of the received content to partition the content into segments. In one embodiment, step 110 partitions the content into segments using data fingerprinting, such applying a threshold function to the rolling Rabin-Karp fingerprint of the data.

In another embodiment, step 110 partitions the content into segments based on the low-level and/or high-level structure of the content. For example, if the content includes a web page, an embodiment of step 110 may specify segments based on the HTML markup tags within the content. This generates a low-level segmentation of the content, with each segment corresponding to a tag of interest, its parameters, and its enclosed data. In an example of a high-level segmentation, step 110 may assign each article on the front page of a news web site to its own segment. Both low- and high-level structure of content may be analyzed using templates, heuristics, or parameters specified by a system administrator. Additionally, segments may be flat or hierarchical and potentially reference other segments. In a further embodiment, different types of segmentation may be applied to different portions and/or types of data within the received content. For example, step 110 may segment content behavior data, such as scripts, differently than content markup data.

Step 115 identifies segments in the content that are duplicated elsewhere in the content, in other associated content, and/or in content previously retrieved and likely to be cached by the client device. For the first case, step 115 identifies segments that are not unique within the received content. For example, the received content may include words or phrases that are repeated one or more times. If there are segments corresponding with these repeated words or phrases, then step 115 will identify each repeated instance of this segment as a duplicate segment.

For the second case, step 115 identifies segments in the content that are duplicated in other associated content. For example, if the content is a web page associated with a web site, then associated content may include other web pages also included in this web site. As an example, a web site may include a home page and numerous other web pages linked with the home page and providing additional information. This collection of the home page and some or all of its linked web pages (and optionally web pages linked with deeper links) may be analyzed to identify duplicated segments across any combination of these web pages.

For the third case, step 115 identifies segments that are duplicated in different content previously retrieved and likely to be cached by the client device. In an embodiment, the history of content previously accessed by a specific client device is maintained. For example, a web site provider may record a history of the web pages previously requested by a given client device.

In another embodiment, the client device provides the content provider with information indicating which different content was previously accessed and/or is currently in its cache. For example, a client device requesting a web page may include a browser cookie or other parameter with its request to indicate that it has previously accessed other content from the content provider.

In this example, a client device that previously retrieved this other content may or may not still have this content in its cache. Thus, in a further embodiment, additional analysis may be performed, such as examining the time elapsed since the other content was previously retrieved, to better estimate if the client device has cached previously retrieved content.

Regardless of how step 115 determines if the client device has previously retrieved other content, step 115 compares its local copy or record of the previously retrieved content with the content received by step 105. This comparison identifies segments in this content that are duplicates of segments in other, previously retrieved content.

Step 120 transforms the received content by removing segments that are duplicated in this content, associated content that has not been retrieved by the client, and/or previously retrieved and potentially cached content. For each duplicate segment, step 120 removes this segment from the content and replaces it with a reference to a single instance of this segment. This single instance of the segment may be in the received content, associated content that has not been retrieved by the client, previously retrieved and potentially cached content, or a separate file, document, or data structure generated by step 120. The data structure used to store single instances of segments may be a key/value object that provides access to stored segments in response to corresponding keys, labels, or other unique identifiers. In this example, the duplicate segments removed from the content are replaced with the corresponding keys used to store the segments in the key/value object. In an embodiment, single instances of duplicated segments from multiple content items are stored in a single separate file, document, or other data structure.

Because each data segment is represented in the content and any associated data structures to be sent to the client device only one time, at the most, the result of step 120 is transformed content that is substantially reduced in size from the original format of the content. If duplicate segments are identified with respect to different content previously retrieved by the client device, then the transformed content may omit some or all of the segments entirely, which results in further reductions in size. Step 120 may optionally perform other types of optimizations, such as general data compression, in creating the transformed content.

In an embodiment, if duplicate segments in the content are identified with respect to other content previously sent to and potentially cached by the client device, then the transformed content generated by step 120 may be different for each client device that requests this content, depending on each clients' history of retrieving content.

Following step 107, step 125 generates a client-side reconstruction script to reconstruct the content in its original form on the client side of the WAN. In an embodiment, the client side script is adapted to be executed by a web browser or other scriptable application on the client device. The client-side reconstruction script may be implemented in any scripting or programming language supported by the web browser or the client device, such as JavaScript.

In one embodiment where step 107 includes content segmentation, when the client-side reconstruction script is executed by an application on the client, the client-side reconstruction script parses the transformed content to identify references to segments, such as keys corresponding with segments stored in a separate key/value object. The client-side reconstruction script then replaces each reference with its corresponding data. In other embodiments, the client-side reconstruction script is adapted to perform any other data reconstruction and/or decompression technique known in the art to reconstruct or reproduce the original received content on the client.

In one implementation, the client-side reconstruction script is adapted to generate a string or other text variable representing the reconstructed content. Once the transformed content has been completed parsed, the client-side reconstruction script is adapted to use a command, such as the "document.write" JavaScript command, to force a client device's web browser or other application to reload and process the reconstructed content.

In another implementation, the client-side reconstruction script is adapted to parse the transformed content and associated segment data to dynamically manipulate a data structure representing the content in memory, such as a document object model (DOM). In this implementation, the client-side reconstruction script inserts segments into the DOM or other browser or application data structure based on the references in the transformed content.

In some cases, the received content may include its own content behavior data, such as scripts, prior to any content transformation. This content behavior data may be responsive to events sent by the web browser or other application, such as a JavaScript "window.onload" event that indicates to the content behavior data that the content has be successfully loaded by the web browser. To ensure that the reconstructed content functions properly, a further embodiment of the client-side reconstruction script reproduces any events or other status indicators generated by the web browser or other application during or following the reconstruction of the original content from the transformed content.

In an embodiment, the client-side reconstruction script generated by step 125 includes the data structure, such as the key/value object, used to store single instances of the segments.

In an alternate embodiment, the client-side reconstruction script is created in a separate file from the data structure storing the segments. In this embodiment, the client-side reconstruction script includes generalized logic adapted to reconstruct any content given the corresponding transformed content and one or more data structures including the segments to be restored. Because this embodiment of the client-side reconstruction script can operated with any transformed content and associated segment data structures, it may only need to be communicated to the client device once and then cached by the client device for future use. In this embodiment, step 125 may be omitted if the client device has already received and potentially cached this generalized client-side reconstruction script. If the client device no longer has this client-side reconstruction script in its cache, then the client may request another copy of the script from the content provider.

Step 130 sends the transformed content to the client device. Step 130 may communicate with the client device using any type of communications network and communications protocol. In an embodiment, step 130 uses a web protocol, such as HTTP to communicate the transformed content to the client device.

If the client device has not previously received the client-side reconstruction script needed to convert the transformed content back to its original format, step 130 also sends the client-side reconstruction script to the client device. Step 130 may also send the client-side reconstruction script to the client device if it is specifically requested by the client device, which may occur if the assumption that the client device has previously cached the client-side reconstruction script is incorrect. Similarly, if the single instances of the duplicated segments are stored separately, such as in a separate document or other data structure or in other content, step 130 may send this document, data structure, or other content to the client device. Step 130 may also send a copy of the segments to the client device only if it is specifically requested by the client device, which may occur if the assumption that the client device has previously cached the segments is incorrect.

As described above, upon receiving the transformed content, the client device executes the client-side reconstruction script to convert the transformed content back to its original form. The client device may then present the content to one or more users. If the client-side reconstruction script requires segments that have not been previously retrieved and cached by the client device, the client-side reconstruction script in conjunction with the web browser or other application is adapted to request these segments from the content provider. For example, single instances of duplicated segments may be stored in a separate html document, for example called "segments.htm." The transformed content may include a reference to this segments.htm document. If the segments.htm document has been previously retrieved and cached by the client device, then the web browser or other application executing the client-side reconstruction script will access this cached copy of the document to retrieve segments referenced in the transformed content. If this segments.htm document is not cached by the client device, then the web browser or other application will request this document from the content provider, for example as a request for a related web page. Upon receiving a copy of this document, the client-side reconstruction script will access the document to retrieve segments referenced in the transformed content. The web browser or other application may also cache this document for future reference by additional transformed content items.

Step 135 optionally updates a record of the content accessed and potentially cached by the client device to include the received content from step 105. In an embodiment, step 135 may update a log or other data structure maintaining a history of the content retrieved by the client device. In another embodiment, step 135 sets a browser cookie or other parameter on the client device to indicate the content retrieved by the client device. The client device may then present this cookie with its request for additional content, thereby indicating to the content provider which content it has already retrieved and potentially cached.

Figure 2:
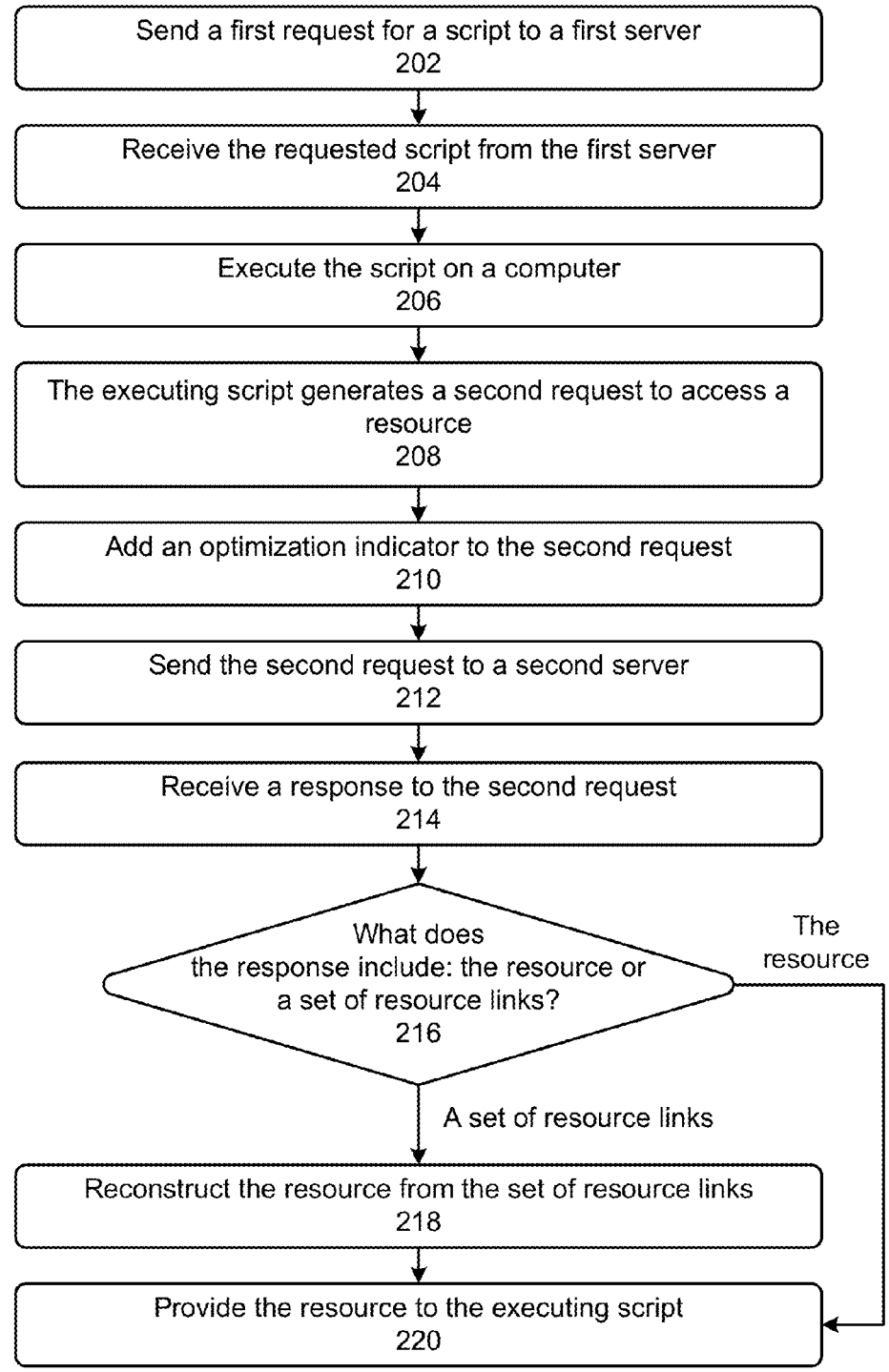
FIG. 2 illustrates a process for optimizing resource access in accordance with some embodiments described herein.

FIG. 2 illustrates a process for optimizing resource access in accordance with some embodiments described herein. In step 202, a first request for a script is sent from a computer to a first server. In this disclosure, terms such as "computer," "server," etc. generally refer to devices that are capable of performing computations, which include, but are not limited to, handheld computing devices (e.g., tablet computers, mobile phones, smart phones, etc.), laptop computers, desktop computers, distributed computers, printers, appliances, etc. For example, the first request can be sent by a web browser executing on a handheld computing device or a smartphone. The computer then receives the requested script from the server (step 204). In some embodiments, the script is a JavaScript script. Next, the script can be executed on the computer (step 206). The executing script can then generate a second request to access a resource (step 208). For example, the executing script can generate the second request to access data that is to be displayed on the web browser.

An optimization indicator can then be added to the second request (step 210), and the second request can be sent to a second server (step 212). In some embodiments, when the script wants to send the second request, the script invokes a library routine, and the library routine adds the optimization indicator before sending the second request to the second server. In other embodiments, the second request is transparently intercepted at the computer or at an intermediate system through which the second request passes. The computer or intermediate system that intercepts the second request can then add the optimization indicator to the second request before sending the second request to the next hop in the path to the second server. The optimization indicator can be used to notify the second server that the client computer is capable of handling resources that have been optimized using some optimization technique.

Next, a response to the second request is received at the computer (step 214). The computer can then check if the resource was optimized by the second server (e.g., if the second server understood the optimization indicator and was capable of optimizing the resource, then the second server would have optimized the resource). Specifically, in step 216, the computer can check if the response includes the resource (i.e., the second server did not optimize the resource) or a set of resource links (i.e., the second server optimized the resource). Each resource link in the set of resource links can point to a data segment in a set of data segments that was generated by performing data deduplication on the resource. In some embodiments, each resource link in the set of resource links is a URL (Universal Resource Locator).

If the response includes the resource, the computer can provide the resource to the executing script (step 220). On the other hand, if the response includes a set of resource links, the computer can reconstruct the resource from the set of resource links (step 218), and then provide the reconstructed resource to the executing script (step 220).

In some embodiments, reconstructing the resource based on the set of resource links includes checking if each of the resources identified by the resource links is available in a local cache (e.g., a web browser cache). If a resource is available in the local cache, the resource (e.g., a segment) pointed to by the resource link is retrieved from the web browser cache. Otherwise, a third request can be sent to a third server (e.g., another web server or the same web server that sent the set of resource links) to retrieve the resource identified by the resource link. The terms "first server," "second server," and "third server" can refer to the same server or can refer to different servers (e.g., in some embodiments, the second and the third servers can be the same server).

Figure 3:
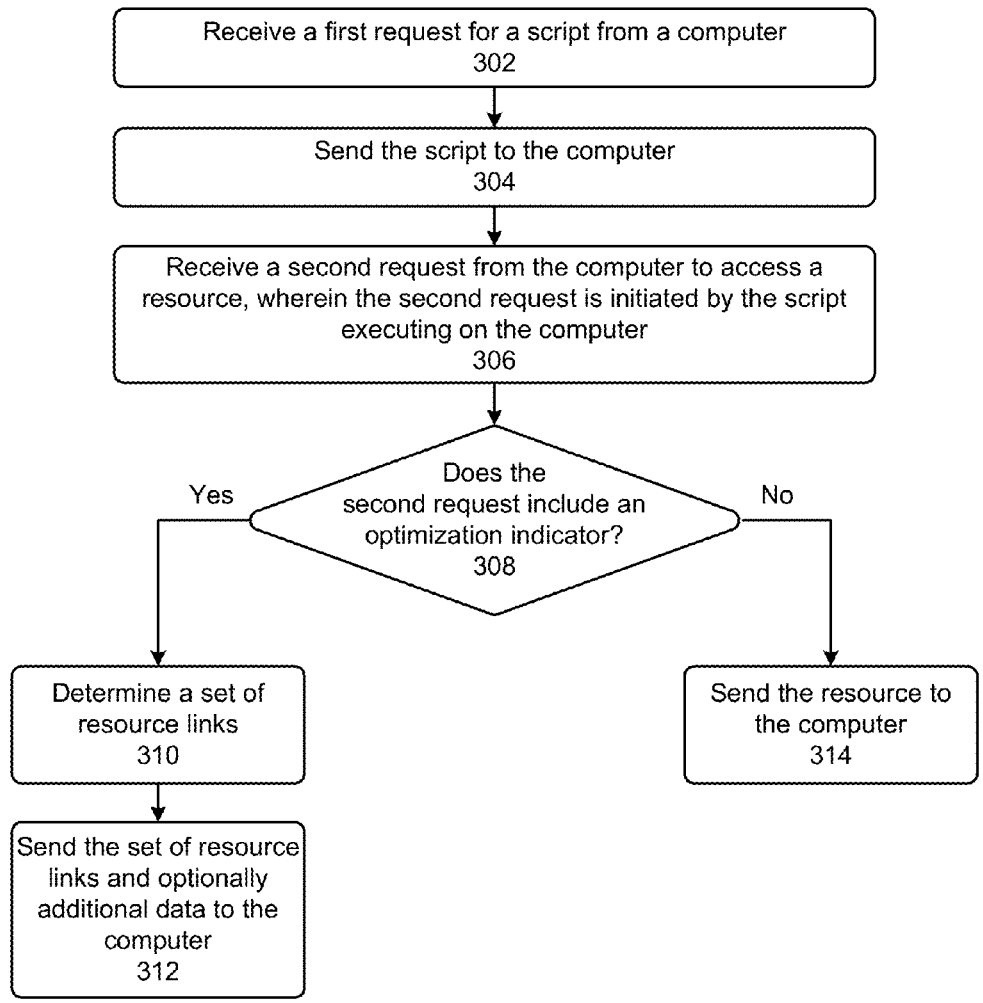
FIG. 3 illustrates a process for optimizing resource access in accordance with some embodiments described herein.

FIG. 3 illustrates a process for optimizing resource access in accordance with some embodiments described herein. The process can begin by a server receiving a first request for a script from a computer (step 302). Next, the server can send the requested script to the computer (step 204). The computer can then execute the script, and the executing script can initiate a second request to access a resource to the server. The server can then receive the second request from the computer to access a resource, wherein the second request was initiated by the script executing on the computer (step 306).

The server can then check if the second request includes an optimization indicator (step 308). If the second request does not include an optimization indicator, then the server can send the resource (i.e., without optimization) to the computer (step 314). On the other hand, if the second request does include an optimization indicator, then the server can optimize or transform the resource by determining a set of resource links (step 310). In some embodiments, each resource link identifies a data segment in a set of data segments that was generated by performing data deduplication on the resource. The server can then send the set of resource links (where each resource link points to a particular segment) and additional data to the computer (step 312). Note that not all data has to be represented as a segment, i.e., the optimized version of the data can include a mix of segments and non-optimized data. The term "additional data" in step 312 refers to data that is not represented as a segment.

Figure 4:
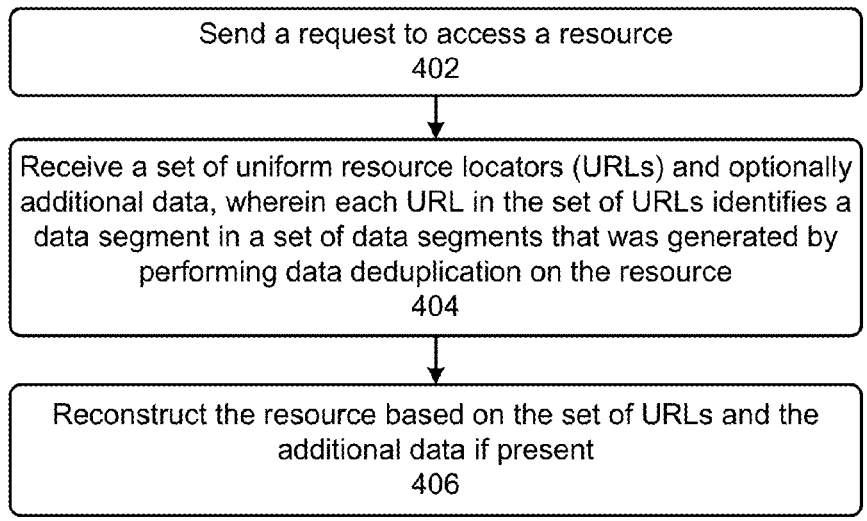
FIG. 4 illustrates a process for obtaining a resource in accordance with some embodiments described herein.

FIG. 4 illustrates a process for obtaining a resource in accordance with some embodiments described herein. The process can begin by a client computer sending a request to a server computer to access a resource (step 402). Next, the client computer can receive a set of URLs and optionally additional data, wherein each URL in the set of URLs identifies a data segment in a set of data segments that was generated by performing data deduplication on the resource (step 404). The client computer can then reconstruct the resource based on the set of URLs and the additional data if present (step 406).

Figure 5:
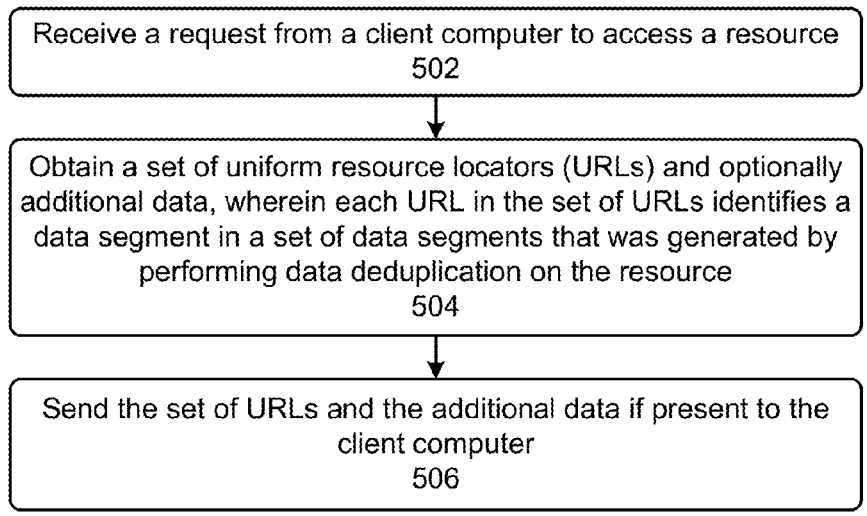
FIG. 5 illustrates a process for providing a resource in accordance with some embodiments described herein.

FIG. 5 illustrates a process for providing a resource in accordance with some embodiments described herein. The process can begin by a server computer receiving a request from a client computer to access a resource (step 502). Next, the server computer obtains a set of uniform resource locators (URLs) and optionally additional data, wherein each URL in the set of URLs identifies a data segment in a set of data segments that was generated by performing data deduplication on the resource (step 504). The server computer can then send the set of URLs and the additional data if present to the client computer (step 506).

Figure 6A:
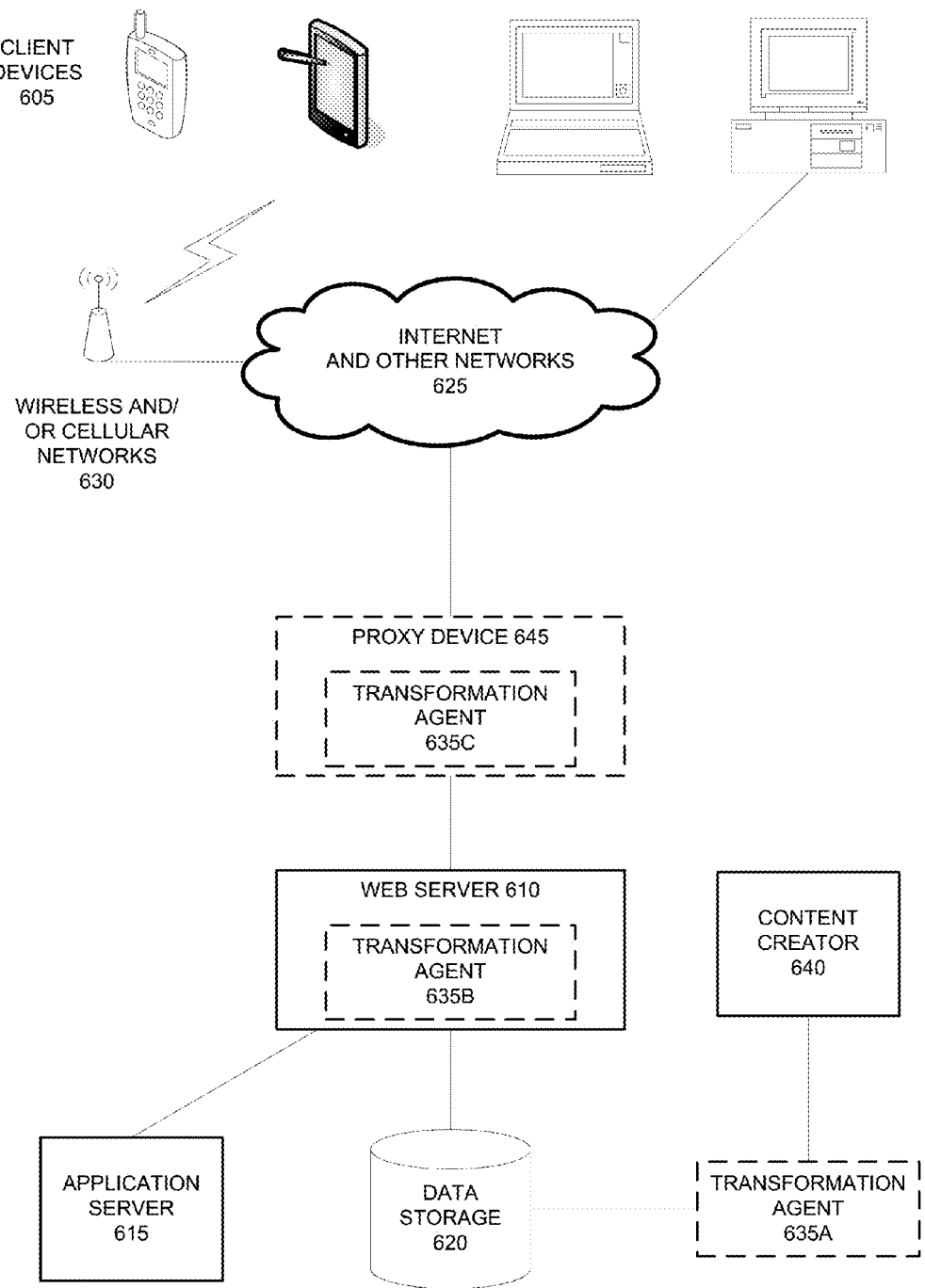
FIGS. 6A-6B illustrate systems and networks suitable for use with some embodiments described herein.
Figure 6B:
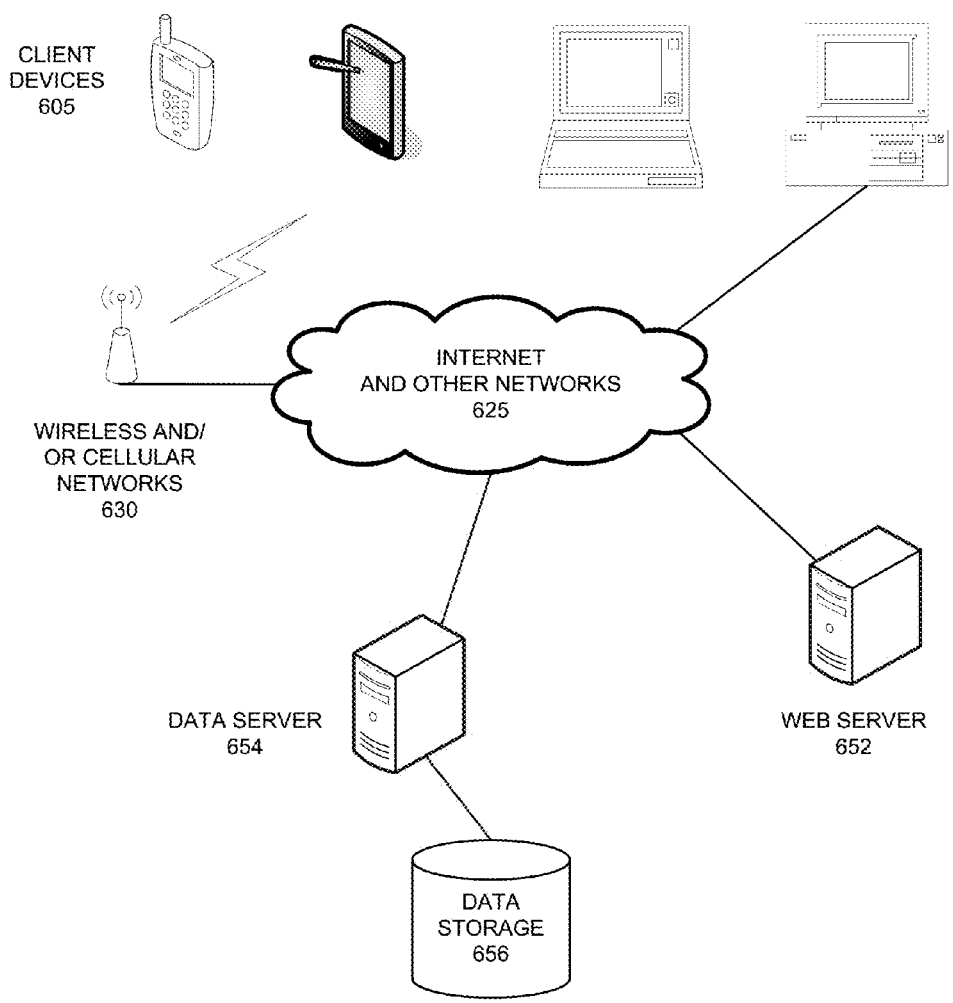

FIGS. 6A-6B illustrate systems and networks suitable for use with some embodiments described herein. In FIG. 6A, client device 605 can include portable and desktop personal computers, tablet computers, and/or smartphones or other mobile electronic devices. In general, the system illustrated in FIG. 6A can interface with any type of electronic device, such as a thin-client computer, Internet-enabled mobile telephone, mobile Internet access device, electronic book, or personal digital assistant, capable of displaying and navigating web pages or other types of electronic documents. Although system is shown with four client systems, any number of client systems can be supported.

A web server 610 is used to process requests from web browsers and standalone applications for web pages, electronic documents and other data from the user computers. The web server 610 may also provide syndicated content, such as RSS or Atom feeds.

One or more application servers 615 can operate one or more data applications that can be implemented as one or more scripts or programs written in any programming language, such as Java, C, C++, C#, or any scripting language, such as JavaScript or ECMAScript, Perl, PHP, Python, Ruby, or TCL. Data applications can be built using libraries or application frameworks, such as Rails or .NET.

The data applications on application server 615 and the web server 610 can store or retrieve data from data storage 620. Data storage 620 may include one or more file servers and/or databases, such as a relational database.

In an embodiment, the web server 610, application server 615, and/or data storage 620 may be implemented as virtual machines and/or applications operating on one or more general purpose computers. Web server 610, application server 615, and data storage 620 are connected via a local and/or public or private wide-area network. Web server 610, application server 615, and/or data storage 620 are also connected with the internet or other local- and wide-area networks 625 and/or wireless and/or cellular data networks 630.

As described above, some embodiments include a content transformation agent that transforms content at the server side of a WAN, such as the internet, to decrease the size of the content, thereby reducing the time and bandwidth required to communicate this content over the WAN to client devices. The content transformation agent may be located in many alternate locations within the system illustrated in FIG. 6A.

For example, a content transformation agent 635A may be used by a content creator 640 to process static content, such as static web sites, to create transformed content. In this example, the transformed content is then stored by the data storage 620 and communicated with client devices 605 by the web server 610.

In another example, a content transformation agent 635B is located within a web server 610. In response to a web page request from one of the client devices 605, the web server 610 retrieves the web page from data storage 620 and/or dynamically generates the web page alone or in conjunction with application server 615. Once the web server 610 retrieves and/or generates the web page to be returned to the requesting client device, the content transformation agent 635B then transforms the web page or other content from its original format to a transformed format that is reduced in size, as described above. The transformed web page or other transformed content is the sent to the requesting client device 605.

Similarly, in yet another example, a content transformation agent 635C may be located within a proxy device 645 or any other application or device between the web server 610 and the client devices 605. Examples of proxy devices 645 include web optimization devices, load balancing devices, network monitoring devices, and firewall and security devices. In still another example of a proxy device 645, the content transformation agent 635C may be a standalone device or application.

Example content transformation agent 635C intercepts web pages or other content as they are sent from the web server 610 to client devices 605, transforms the web page or other content from its original format to a transformed format that is reduced in size, as described above, and then sends the transformed content to the requesting client devices 605.

In FIG. 6B, a client device (e.g., one of the client devices 605) can send a request (e.g., an HTML request) to web server 652 to obtain a script (e.g., a JavaScript application). In response to the request, web server 652 can send the script to the client device, and then the client device can execute the script. In some embodiments, the response from web server 652 can be an empty web page that includes the script. When the script is executed at the client device, the script can obtain data from one or more sources, generate the information that is to be displayed on the web page, and then display the generated information to the user.

Specifically, in some embodiments, the script (which is executing on the client device) can send a resource request (e.g., an AJAX call) to data server 654. Data server 654 can then provide a response (e.g., in JSON/XML format), to the client device. The executing script can then use the data in the response to generate the information that is to be displayed on the client device's screen. ("AJAX" is an acronym for "asynchronous JavaScript and XML," "XML" is an acronym for "Extensible Markup Language," and "JSON" is an acronym for "JavaScript Object Notation.")

Some embodiments described herein optimize the communication between the executing script and data server 654. In some embodiments, the resource request from the client device to data server 654 can include an optimization indicator. When data server 654 receives the resource request, data server 654 can check if the resource request includes an optimization indicator. If the resource request includes an optimization indicator and if data server 654 is capable of optimizing the requested resource (which may be stored in data storage 656), then data server 654 can send the optimized resource to the client device. On the other hand, if the resource request does not include an optimization indicator, then data server 654 can send the resource in a non-optimized form to the client device.

In some embodiments, the resource can be optimized by performing data deduplication on the resource. Specifically, a content transformation agent (which can be implemented in data server 654 or can implemented in a separate WAN optimization device) can partition the resource (e.g., a large data file) into segments. The content transformation agent can then identify and remove duplicate segments within the content. In a further embodiment, the content transformation agent may also identify and remove segments in content that are duplicative of segments previously provided to the client, which the client may have cached. In some embodiments, each segment may be accessed by the client device using a web service that conforms to the REST (REpresentational State Transfer) architecture. For example, each segment may be represented as a URL and accessed through an HTTP (Hypertext Transfer Protocol) request. The optimized content can then be sent to the client device, and a content reconstruction agent can reconstruct the optimized resource at the client device.

In some embodiments, the code the inserts the optimization indicator, the content transformation agent, and the content reconstruction agent can be included in a library that exposes a standard API (Application Programming Interface). Specifically, when the executing script on the client device sends a resource request to data server 654, the executing script can call an appropriate function in the library which adds the optimization indicator to the resource request and sends the resource request to the data server. The server application that processes the resource request can include an implementation of the content transformation agent. Finally, when the response is received by the executing script, the executing script can call an appropriate function in the library that includes an implementation the reconstruction agent for reconstructing the optimized resource.

Figure 7:
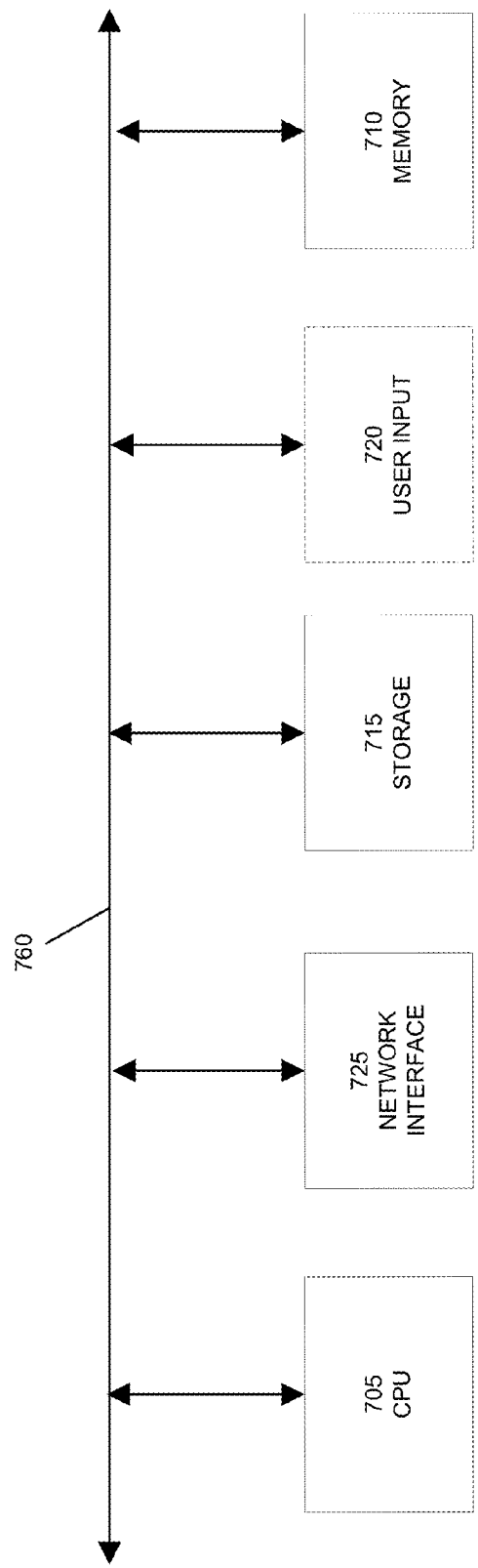
FIG. 7 illustrates an example computer system suitable for implementing embodiments described herein.

FIG. 7 illustrates an example computer system suitable for implementing embodiments described herein. FIG. 7 is a block diagram of a computer system 700, such as a personal computer or other digital device, suitable for practicing some embodiments described herein. Embodiments of computer system 700 may include dedicated networking devices, such as wireless access points, network switches, hubs, routers, hardware firewalls, WAN and LAN network traffic optimizers and accelerators, network attached storage devices, storage array network interfaces, and combinations thereof.

Computer system 700 includes a central processing unit (CPU) 705 for running software applications and optionally an operating system. CPU 705 may be comprised of one or more processing cores. Memory 710 stores applications and data for use by the CPU 705. Examples of memory 710 include dynamic and static random access memory. Storage 715 provides non-volatile storage for applications and data and may include fixed or removable hard disk drives, flash memory devices, ROM memory, and CD-ROM, DVD-ROM, Blu-ray, or other magnetic, optical, or solid state storage devices.

In a further embodiment, CPU 705 may execute virtual machine software applications to create one or more virtual processors capable of executing additional software applications and optional additional operating systems. Virtual machine applications can include interpreters, recompilers, and just-in-time compilers to assist in executing software applications within virtual machines. Additionally, one or more CPUs 705 or associated processing cores can include virtualization specific hardware, such as additional register sets, memory address manipulation hardware, additional virtualization-specific processor instructions, and virtual machine state maintenance and migration hardware.

Optional user input devices 720 communicate user inputs from one or more users to the computer system 700, examples of which may include keyboards, mice, joysticks, digitizer tablets, touch pads, touch screens, still or video cameras, and/or microphones. In an embodiment, user input devices may be omitted and computer system 700 may present a user interface to a user over a network, for example using a web page or network management protocol and network management software applications.

Computer system 700 includes one or more network interfaces 725 that allow computer system 700 to communicate with other computer systems via an electronic communications network, and may include wired or wireless communication over local area networks and wide area networks such as the Internet. Computer system 700 may support a variety of networking protocols at one or more levels of abstraction. For example, computer system may support networking protocols at one or more layers of the seven layer OSI network model. An embodiment of network interface 725 includes one or more wireless network interfaces adapted to communicate with wireless clients and with other wireless networking devices using radio waves, for example using the 802.11 family of protocols, such as 802.11a, 802.11b, 802.11g, and 802.11n.

An embodiment of the computer system 700 may also include one or more wired networking interfaces, such as one or more Ethernet connections to communicate with other networking devices via local or wide-area networks.

The components of computer system 700, including CPU 705, memory 710, data storage 715, user input devices 720, and network interface 725 are connected via one or more data buses 760. Additionally, some or all of the components of computer system 700, including CPU 705, memory 710, data storage 715, user input devices 720, and network interface 725 may be integrated together into one or more integrated circuits or integrated circuit packages. Furthermore, some or all of the components of computer system 700 may be implemented as application specific integrated circuits (ASICS) and/or programmable logic.

Further embodiments can be envisioned to one of ordinary skill in the art. Combinations or sub-combinations of the subject matter disclosed herein can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
    sending a first request for a script to a first server;
    receiving the script from the first server in response to the first request;
    executing the script on a computer;
    the executing script generating a second request to access a resource;
    adding an optimization indicator to the second request, wherein the optimization indicator indicates an ability to handle resources that have been optimized, wherein said adding the optimization indicator comprises (1) invoking a library routine, (2) transparently intercepting the second request at the computer, or (3) transparently intercepting the second request at an intermediary device;
    sending the second request to a second server;
    receiving a response to the second request from the second server;
    in response to determining that the response includes the resource, providing the resource to the executing script; and
    in response to determining that the response includes a set of resource links, reconstructing the resource based on the set of resource links, and providing the reconstructed resource to the executing script.

2. The method of claim 1, wherein each resource link in the set of resource links is a uniform resource locator (URL).

3. The method of claim 1, wherein said reconstructing includes:
    for each resource link in the set of resource links,
        in response to determining that the resource identified by the resource link is available in a web browser cache on the computer, retrieving the resource identified by the resource link from the web browser cache, and
        in response to determining that the resource identified by the resource link is not available in the web browser cache on the computer, sending a third request to a third server to retrieve the resource identified by the resource link.

4. The method of claim 1, wherein each resource link in the set of resource links identifies a data segment in a set of data segments that was generated by performing data deduplication on the resource.

5. The method of claim 1, wherein the first request is sent by a web browser executing on the computer.

6. The method of claim 1, wherein the script is a JavaScript script.

7. The method of claim 1, wherein the computer is a handheld computing device.

8. A method, comprising:
    receiving a first request for a script from a computer;
    sending the script to the computer;
    receiving a second request from the computer to access a resource, wherein the second request is initiated by the script executing on the computer;
    in response to determining that the second request includes an optimization indicator, wherein the optimization indicator indicates an ability to handle resources that have been optimized, and wherein the optimization indicator was added to the second request by (1) invoking a library routine, (2) transparently intercepting the second request at the computer, or (3) transparently intercepting the second request at an intermediary device,
        determining a set of resource links, wherein each resource link in the set of resource links identifies a data segment in a set of data segments that was generated by performing data deduplication on the resource, and
        sending at least the set of resource links to the computer; and
    in response to determining that the second request does not include the optimization indicator, sending the resource to the computer.

9. The method of claim 8, wherein each resource link in the set of resource links is a uniform resource locator (URL).

10. The method of claim 8, wherein the script is a JavaScript script.

11. The method of claim 8, wherein the computer is a handheld computing device.

12. A method, comprising:
a client computer sending a request to a server computer to access a resource;
the server computer receiving the request from the client computer to access a resource, wherein the request includes an optimization indicator that indicates an ability to handle resources that have been optimized;
the server computer obtaining a set of uniform resource locators (URLs), wherein each URL in the set of URLs identifies a data segment in a set of data segments that was generated by performing data deduplication on the resource;
the server computer sending at least the set of URLs to the client computer;
the client computer receiving at least a set of URLs, wherein each URL in the set of URLs identifies a data segment in a set of data segments that was generated by performing data deduplication on the resource; and
the client computer reconstructing the resource based on the set of URLs.

13. A method, comprising:
an intermediary device transparently intercepting a request from a client computer to a server computer to access a resource;
the intermediary device adding an optimization indicator to the request, wherein the optimization indicator indicates an ability to handle resources that have been optimized;
the intermediary device sending the request to the server computer to access the resource, wherein the request includes the optimization indicator;
the intermediary device receiving at least a set of uniform resource locators (URLs), wherein each URL in the set of URLs identifies a data segment in a set of data segments that was generated by performing data deduplication on the resource;
the intermediary device reconstructing the resource based on the set of URLs; and
the intermediary device sending the reconstructed resource to the client computer.

* * * * *